June 12, 1945. M. G. HASTINGS ET AL Re. 22,651

FILTER

Original Filed Aug. 23, 1938 2 Sheets-Sheet 1

Inventors.
Merrill G. Hastings
Harry J. Haywood
by T. T. Greenwood atty

June 12, 1945. M. G. HASTINGS ET AL Re. 22,651

FILTER

Original Filed Aug. 23, 1938 2 Sheets-Sheet 2

Inventors.
Mercer G. Hastings
Harry F. Weyrauch
by T. T. Freeman Atty

Reissued June 12, 1945

Re. 22,651

UNITED STATES PATENT OFFICE 22,651

FILTER

Merrill G. Hastings, Wellesley, and Harry J. Hayward, Arlington, Mass., assignors to Merrill G. Hastings and Emita E. Hastings, both of Wellesley, Mass., and Robert L. Fielding, Cambridge, Mass.

Original No. 2,368,216, dated January 30, 1945, Serial No. 226,308, August 23, 1938. Application for reissue March 19, 1945, Serial No. 583,402

15 Claims. (Cl. 210—169)

This invention relates to filters and especially filters of the tubular diamond-weave type set forth in Patent No. 1,958,268, dated May 8, 1934, and has for an object an improved construction of filter element permitting faster and better filtering and increasing the capacity, in terms of the total quantity of fluid filtered, of the filter element before the passages thereof have been clogged.

The filter element of the above patent is tubular comprising a foraminous core upon which is wound a multiplicity of layers of spaced convolutions of a napped strand applied in crisscross fashion to form a plurality of diamond shaped filtering passages through the side wall of the element through which the liquid to be filtered is caused to pass, the strands being napped during the progress of winding to form fibres which occupy the passages and catch impurities in the liquid being filtered.

Due to the manner of winding the strand the two axes of a cross-section of each diamond shaped passage lie respectively circumferentially and axially of the element, the circumferential axis increasing in length as the winding progresses and the axial axis remaining constant. In the filter element or tube of the above patent the direction of the napping is circumferential so that the napped fibres, which are carried across the diamond shaped filtering passages and are bound down by the overlaid strands, lie circumferentially of the tube and along the circumferential axis of the diamond shaped filtering passages. Since for various reasons not necessary to explain here it is most practical in most cases to have at the start of the winding a diamond shape in which the circumferential axis is at least as long as the axial axis, and since as the winding progresses the circumferential axis increases in length while the axial axis remains constant, it results that throughout a substantial part of the thickness of the winding the circumferential axis is longer than the axial axis. In view of these facts and in view of the further fact that it is difficult to increase beyond a certain point the average length of the napped fibre, the circumferential axis of the diamonds of tubes made under the above patent have to be relatively short which means a small cross-sectional area of passage, in order that a sufficient amount of the circumferentially napped fibres may be carried completely across the passage.

In commercial practice we have found that with tunnels of small area, or sufficiently small to enable there being carried completely across the tunnels a sufficient amount of the napped fibres to secure the fineness of filtration desired, the flow of the filtered liquid through the tunnels of a single filter tube is insufficient to permit the free use of the tubes in certain applications on account of the number of tubes required.

We have discovered, however, a new method of forming and drawing the napped fibres across the tunnels which materially increases the amount of the napped fibres that are carried completely across the tunnel passages, thereby increasing the density of the napped fibres drawn completely across the tunnels, which improves the filtration, and allowing tunnels of larger cross-section area to be used, which enlarges the capacity of the filter tubes as respects both the rate of flow of the filtered liquid and the total amount of the liquid which may be filtered before the tunnel passages of the tubes have become clogged. We have found that if the method of napping heretofore used is entirely changed and instead of drawing the napped fibres circumferentially of the tube, a belt or other means is used to draw the nap axially of the tube there will be a very unexpected improvement in result in that the fibres as a result of the component of the axial napping movement and the circumferential rotation of the tube will be drawn more nearly in the direction of the shortest distance across the tunnels and therefore a greater amount of the napped fibres will reach entirely across the tunnel and be locked in place by the strands subsequently laid. Such a filter element and the method of making it constitutes an object of the present invention.

Another object of the invention is the method of napping by winding the rotating tube while in contact with a napping belt moving in the axial direction of the tube, the speed of the belt throughout the winding process being preferably as great or greater than the circumferential speed of the tube so that the napped fibres are laid at an angle of inclination with the axis of the tube approximating the direction of shortest distance between the sides of the diamond shaped passages.

It is a further object of the present invention to provide a filtering tube with a plurality of layers of passage-traversing napped fibres that lie at different angles so that an impurity, as a thin flake, in the liquid being filtered and that may be aligned with the fibres of one layer and hence may pass therebetween, is caused to encounter an under layer of otherwise disposed fibres and hence will be caught by and lodge upon such fibres.

Another object of the invention is the method of making such a tube with the layers of parallel napped fibres having a relatively crossed relation to each other by repeated reversals of the direction of napping during the progress of the tube winding operation.

Another object of the invention is to increase the amount of napped fibre without distorting the diamond shaped filtering passages and to maintain a greater uniformity of napped fibre throughout a particular tube and throughout all tubes of a particular type. These results are better accomplished by axial napping rather than by circumferential napping for in axial napping the napping wires are drawn across the strands rather than along the strands as in circumferential napping, thereby raising more nap, and furthermore the nap is more uniform throughout the element due to the better control of the pressure of the face of the napping element on the tube.

A yet further object is generally to improve the construction and performance of filter elements.

Figure 1:
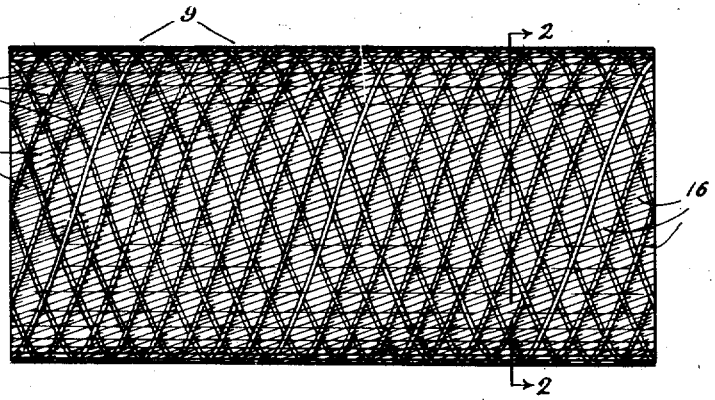
Fig. 1 is a plan view of a filter element embodying the present invention.

As illustrated in Figs. 1 through 4, the tubular filter element 9 is composed of a plurality of layers of fibrous strands 10, more specifically soft yarn or roving, wound in a diamond weave upon a pervious core tube 11 formed of an open mesh wire fabric or netting in a plurality of layers of axially spaced and criss-crossed convolutions that are superposed in the several layers, thereby forming diamond-shaped apertures 12 between the crossed strands that are in alignment, at least in part, to form filtering passages or tunnels 13 through the winding from the circumference to the pervious core.

Due to the manner of winding the roving one axis of a cross-section of the diamond-shaped passage 12 lies substantially in the circumference of the filter while the other axis is parallel with the axis of the filter. For reasons already explained the circumferentially disposed axes of the passages are longer than the axially disposed axes, for a substantial part of the thickness of the element.

In accordance with the present invention the roving composing the filter element is napped in a direction lengthwise of the axis of the filter element to provide fibers 16 which extend from the convolutions across the apertures 12 and lie in a direction which is not circumferential of the filter element but which may be nearly axial thereof or at a predetermined angle which will materially decrease the distance which the napped fibres must traverse to extend across the diamond, the free ends of the fibres preferably being bound under overlying convolutions.

Figure 5:
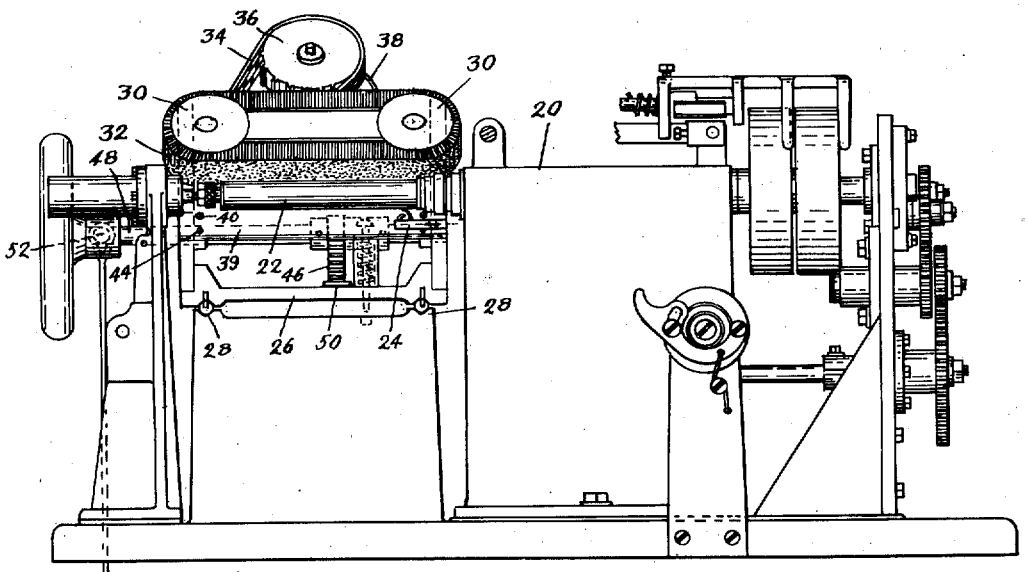
Fig. 5 is a front elevation of a machine for making the filter element of Fig. 1.
Figure 6:
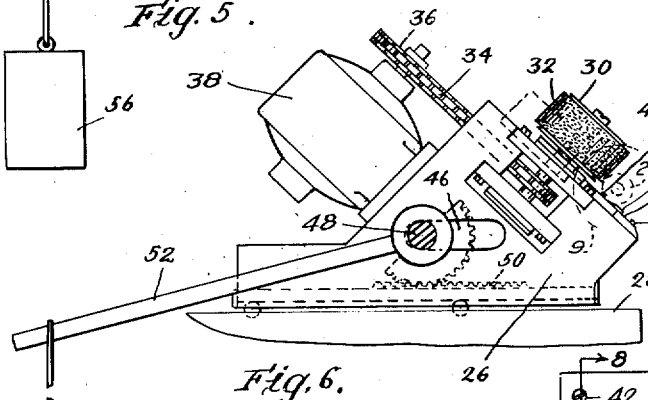
Fig. 6 is a side elevation of the napping frame of Fig. 5.
Figure 8:
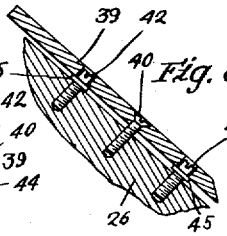
Fig. 8 is a sectional detail taken along line 8—8 of Fig. 7 and illustrating the manner of adjusting said pressure plate.
Figure 7:
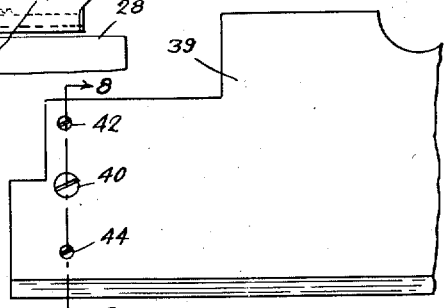
Fig. 7 is a plan detail of the pressure plate of Fig. 6.

The filter element is made by the machine 20 illustrated in Figs. 5 and 6. The machine so far as the winding of the strands is concerned, may be essentially a well known Universal winding machine which includes a rotatable mandrel 22 on which the tube 11 of the filter is placed for winding on the yarn, but any similar machine may be used. The machine has a yarn guide 24 which is reciprocated in front of the mandrel 22 in timed relation with the rotation of the mandrel to lay on the strands in the manner above explained.

The napping of the strands is accomplished by means including a carriage 26 disposed behind the mandrel and movable on ways 28 towards and away from the mandrel. The carriage supports a pair of pulleys 30 between which a napping belt 32 as of card clothing is extended. One of the pulleys is driven by a chain 34 and sprocket 36 from an electric motor 38 carried by the carriage. The carriage is provided with a pressure plate 39 the face of which is at right angles to the work face of the napping belt and is adapted to bear against the tubular filter element 9 on the mandrel, the pressure plate being so positioned with respect to the work face of the belt, the axis of the mandrel and the path of movement of the carriage that the wires of the belt will be always maintained in substantially the same relative contact with the surface of the filter element as it increases in diameter.

In order that the pressure plate can always be kept in proper position, its position can be adjusted to take care of wear in any moving parts of the machine by movement of the screws 40, 42, and 44 at each end of the plate. The screw 40 is passed loosely through the plate and is screw-threaded into the carriage. The screws 42 and 44, disposed on opposite sides of the screw 40, are loosely disposed in said plate and are screw-threaded in the carriage and have outstanding shoulders 45 which bear against the under face of the plate to move the plate 39 relative to the carriage 26.

The carriage is urged toward the tube by a segmental gear 46 fixed to a shaft 48 supported by the frame of the winding machine. The gear meshes with a rack 50 of the carriage and is urged for rotation in a direction to move the carriage toward the tube by a rearwardly extended arm 52 fixed to the shaft 48 and supporting a weight 56 adjustable along the length thereof. The angularity of the arm 52 preferably is such that the weight 56 is caused to exert more pressure on the carriage against the tube as the tube builds up in diameter and the carriage moves backward.

Thus just prior to the winding operation the plate 39 bears against the core 11, which has been positioned on the rotatable mandrel 22 (shown in dotted lines in Fig. 6), under the influence of the weight 56 which tends to move the carriage 26 to the right (Fig. 6). By adjusting the plate 39 by means of screws 42 and 44 the relationship of the respective distances of the face of the pressure plate 39 and of the face of the belt 32, namely, the ends of the wires, from the axis of mandrel 22, may be varied. The variation of the relationship of these distances will determine the amount of the engagement of the wires of the belt 32 with the tubular cylindrical filter element 9 during the winding process. As the diameter of the filter element increases during winding this amount of engagement of the wires of the belt with the filter element will remain substantially the same throughout the winding process, subject to the effect of any progressive increased pressure of the pressure plate 39 against the filter element caused by the increased leverage of the weight 56 as the carriage 26 is forced away from the axis of mandrel 22 by contact of the filter element, as it is wound, with the pressure plate 39. At the conclusion of the winding process the filter element assumes the diameter indicated by the dotted circular line 9 in Fig. 6 and the belt 32 and pulley 30 (Fig. 6) assumes the dotted line position indicated in Fig. 6.

The napping belt 32 is sufficiently wide to engage the periphery of the tube from its smallest to its largest diameter as the tube builds up in diameter and its point of contact with the belt travels upwardly on the belt. The pass of the belt that confronts the tube is long enough to engage it from end to end. With this arrangement as the convolutions are wound on the tube they come in contact with the wires of the travelling belt which brush fibres in a direction axially of the tube to project away from the convolutions across the apertures between the convolutions.

Since the direction of the lay of the napped fibres is along the component of the belt speed and the peripheral speed of the tube, the angle which the napped fibres make with the tube axis depends upon the relation between the belt speed and the peripheral speed of the tube at any part thereof. This angle is smaller at the core than at the circumference of the finished tube since the peripheral speed of the tube increases as the winding builds up, the fibres of the successive layers changing in angle progressively from the core to the circumference, the amount of the total change between the core and the circumference depending upon the ratio of the length of the diameter of the core to the thickness of the wall of the tube. The speed of the napping belt and the speed of the mandrel carrying the tube preferably bear a relationship one to the other such as to cause the napped fibres in the outside layer of yarn, where the area of the diamond shaped tunnel passages is the greatest, to lie approximately in the direction of the shortest distance between the sides of the diamond. By being laid mainly in the direction of the shortest distance across the passages, the napped fibres, or most of them, completely traverse the passages so that their ends are bound down on the tube by the overlaid strand. This results in a very satisfactory filter and represents a marked improvement over a filter tube in which the nap is raised and laid circumferentially of the tube. The effectiveness of the filtration is increased because of the increased amount of napped fibre drawn completely across the passages and held in place by the overlaid strands of yarn. The passages also can be made larger than heretofore thereby permitting a more rapid flow of the fluid to be filtered through the filter and increasing the total amount of the fluid which the filter element can handle before its life is exhausted by the clogging of the tunnel passages.

Figure 9:
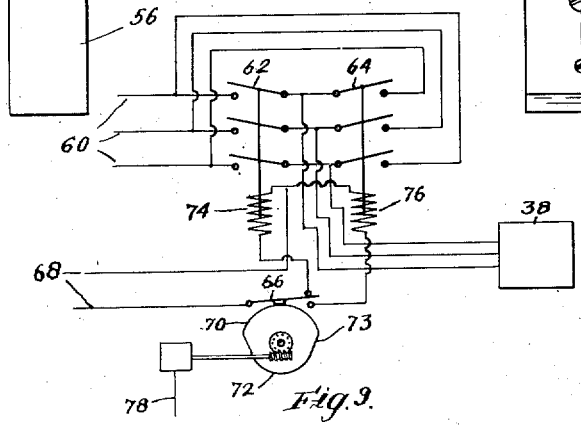
Fig. 9 is a circuit diagram of the timed reversing means for the belt driving motor.

The electric motor 38 is of the reversible type and may be automatically reversed periodically by the means illustrated in Fig. 9 so that the direction of napping is periodically reversed. The reversal is intended to take place at such times as to give the results desired and may take place at approximately each layer or otherwise.

The motor 38 is illustrated in Fig. 9 as being a three phase motor energized from a power source 60 through reversing switches 62 and 64 respectively energized through a double throw switch 66 from a line 68. Said switch 66 is operated by a cam disc having high and low peripheral portions 70 and 72 and intervening inclined portions 73. When the high portion 70 is under the switch 66 the winding 74 is energized to obtain one direction of rotation of the belt driving motor 38 and when the low portion 72 is under the switch the winding 76 is energized to obtain the opposite direction of rotation of the motor. The inclined portions 73 of the cam hold the control circuit open sufficiently long to permit the motor to lose considerable speed before reversal. The cam is driven at suitable speed by a timing motor 78 energized from the circuit 68.

Figure 3:
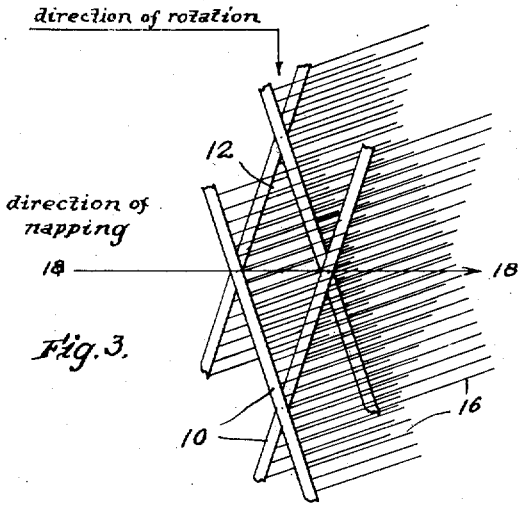
Fig. 3 is an enlarged diagrammatic plan view of a diamond shaped filter passage and the filter fibres arranged in accordance with the present invention.
Figure 2:
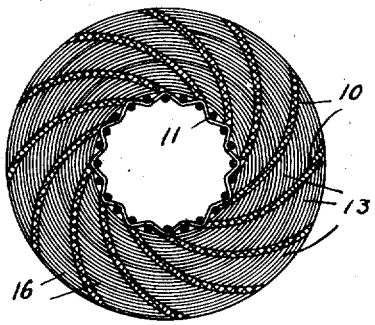
Fig. 2 is a cross-sectional view of the filter element, taken along line 2—2 of Fig. 1.
Figure 4:
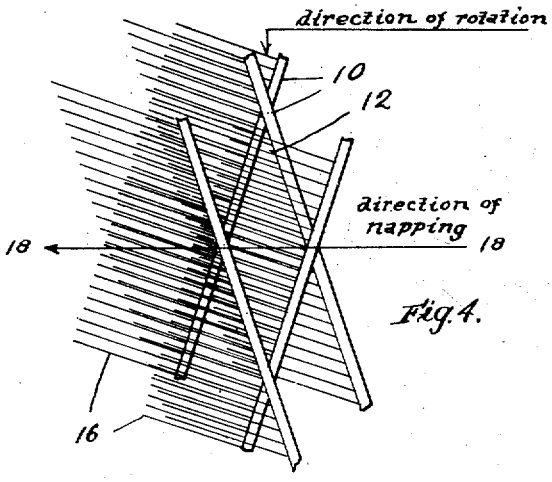
Fig. 4 is a view similar to Fig. 3 but in a different location along the length of the passage and illustrating the opposite inclination of the filtering fibres.

By reason of the reversals of napping during the winding of the tube the fibres in different layers of nap in the filtering tunnels are oppositely inclined. For instance, the lay of the fibres in one section of a tunnel may be as illustrated in Fig. 3, while the lay of the fibres in another part of the same tunnel may be as illustrated in Fig. 4. This arrangement increases the efficiency of filtering as, for instance, a thin flake of an impurity may be aligned with one set of fibres and hence pass therethrough but will be crosswise or at least at an angle with another set of fibres and hence unable to pass between fibres of this set and hence will be caught by the fibres. This action of the filter takes place to a greater or less extent even without reversal of the direction of napping by reason of the progressive change of angle of lay of the fibres from the outside to the inside of the winding as has been explained above.

The reversal of the direction of napping also improves the filtering action in an additional manner. With large apertures the nap may be thinnest at or about the apex of the diamond opposite the sides from which the fibres start. By the reversal of napping, however, a thin section of nap of one layer is overlaid by a thick section of nap of another layer so that any particle that could pass through a thin section has to travel such a tortuous path in going from one thin section to another that it is surely trapped before it can emerge from the filter. Likewise there is a similar staggering of the areas where the ends of the napped fibres are held in place by being embedded in the strands from which they are drawn and of the areas where the opposite ends of the napped fibres are held in place by being bound down by the overlaid strands.

The reversal of direction of napping also results in an intermeshing of the napped fibres formed in napping the layer of the strands which is being wound when the reversal of the direction of napping occurs. This improves the filtration materially in the case of certain liquids, such as oils. Reversal of direction of the napping also increases both the amount and uniformity of napped fibre since the yarn is napped on both sides instead of only on one side and also any diminution in napped fibre due to the twist of the yarn being inclined towards the movement of the napping member when moving in one direction is offset by an increase in napped fibre when the direction of the napping is reversed.

We claim:

1. A tubular filter element comprising a plurality of circumferential layers of spaced crossed convolutions of fibrous strands providing a plurality of radially extending diamond-shaped filtering passages into which fibers extend from and toward strands of the same layer, a preponderance of the fibers so extending between strands of at least one layer extending in directions from strands lying in the pairs of adjacent passage sides forming angles which face the same end of the tubular element toward strands lying in the opposite pairs of adjacent passage sides forming angles which face the other end of the tubular element.

2. A tubular filter element as claimed in claim 1, wherein the general direction of a preponderance of the fibers so extending between strands of a layer progressively changes from layer to layer throughout at least a portion of the thickness of the element.

3. A tubular filter element as claimed in claim 1, wherein a prepondenace of the fibers so extending between strands of one layer are oppositely inclined to a preponderance of the fibers so extending between strands of another layer.

4. A tubular filter element as claimed in claim 1, wherein at least some fibers extend from strands lying in said first-mentioned pairs of passage sides across the passages and are bound in position by over- and under-lying strands lying in said second-mentioned pairs of passage sides, and other fibers extend from said over- and under-lying strands across the same passages in a contrariwise direction and are similarly bound in position by strands lying in said first-mentioned pairs of passage sides.

5. A tubular filter element as claimed in claim 1, wherein at least some fibers extend from strands lying in said first-mentioned pairs of passage sides across the passages and are bound in position by over- and under-lying strands lying in said second-mentioned pairs of passage sides, and other fibers extend from said over- and under-lying strands across the same passages in a contrariwise direction and are similarly bound in position by strands lying in said first-mentioned pairs of passage sides, the angles formed by the fibers extending contrariwise to each other across the passages changing progressively through at least a portion of the thickness of the element.

6. A tubular filter element comprising a plurality of circumferential layers of spaced crossed convolutions of fibrous strands providing a plurality of radially extending diamond-shaped filtering passages into which fibers extend from and toward strands of the same layer, a preponderance of the fibers so extending between strands of at least one layer extending in directions inclined respectively to the directions of the shortest line joining strands of such layer which lie in a pair of opposite parallel sides of the particular passage into which the fibers extend, and said fiber directions and said shortest line directions respectively approaching each other with progressively lessening inclination therebetween from a relatively inner to a relatively outer layer of at least a portion of the thickness of the element.

7. The method of making a tubular filter element which comprises winding a fibrous strand upon a revolving support to form a plurality of layers of spaced crossed convolutions of fibrous strands forming diamond-shaped passages through the element, and napping the fibrous strands in a direction between a direction around the circumference and a direction parallel to the axis of the filter as the winding operation progresses.

8. The method of making a tubular filter element as in claim 7, which includes the step of reversing the direction of napping during the process of winding to change the direction of the lay of the fibres and giving successive sheets of napping a relatively crossed relation.

9. The method of making a tubular filter element which comprises winding a fibrous strand upon a revolving support to form a plurality of layers of spaced crossed convolutions of fibrous strands forming diamond-shaped passages through the winding, and napping the fibrous strands during the process of winding by contact therewith of a napping member moving in a direction parallel to the axis of the filter.

10. The method of making a tubular filter element as in claim 9, which includes controlling the movement of the napping member to change the angle of lay of napped fibers from the inside to the outside of the filter.

11. The method of making a tubular filter element which comprises winding a fibrous strand upon a revolving support to form a plurality of layers of spaced crossed convolutions of fibrous strands forming diamond-shaped passages through the winding, napping the fibrous strands during the process of winding by contact therewith of a napping member moving in a direction parallel to the axis of the filter, and reversing the direction of movement of the napping member during the process of winding.

12. The method of making a tubular filter element which comprises winding a fibrous strand upon a revolving support to form a plurality of layers of spaced crossed convolutions of fibrous strands forming passages through the winding, napping the fibrous strands during the process of winding by moving a strand-contacting napping member in a direction parallel to the axis of the filter and increasing the pressure of the napping member against the strands as winding progresses.

13. The method of making a tubular filter element which comprises winding a fibrous strand upon a revolving support to form a plurality of layers of crossed axially spaced convolutions of fibrous strands forming openings through the layers of the winding, and napping the fibrous strands of separate layers during the process of winding by contact therewith of a movable napping member moving in a direction from end to end of said revolving support to lay napped fibers of a succeeding relatively outer layer in crossed relation with respect to napped fibers of a preceding relatively inner layer.

14. The method of making a tubular filter element which comprises winding a fibrous strand upon a revolving support to form a plurality of layers of crossed axially spaced convolutions of fibrous strands forming diamond-shaped passages through the winding and napping the fibrous strands of separate layers during the process of winding by contact therewith of a napping member moving in a direction from end to end of said revolving support to lay napped fibers crosswise of the passages and at an angle to the axis of the filter, with fibers of one layer in a passage lying in crossed relation with respect to fibers of another layer in the same passage.

15. The method of making a tubular filter element which comprises winding a fibrous strand upon a revolving support to form a plurality of circumferential layers of spaced cross convolutions of fibrous strands providing a plurality of radially extending diamond-shaped filtering passages and napping the fibrous strands during the process of winding by contact therewith of a napping member moving in a direction parallel to the axis of the filter element to extend fibers into the passages from and towards strands of the same layer in directions which, as the winding proceeds, become less inclined, throughout at least a portion of the thickness of the element, to the directions of the shortest line joining strands of such layer lying in a pair of opposite parallel sides of the particular passage into which the fibers extend.

MERRILL G. HASTINGS.
HARRY J. HAYWARD.